Oct. 9, 1945.  L. C. MORRIS  2,386,335
PROCESS FOR THE SEPARATION OF HYDROCARBONS
Filed April 6, 1942
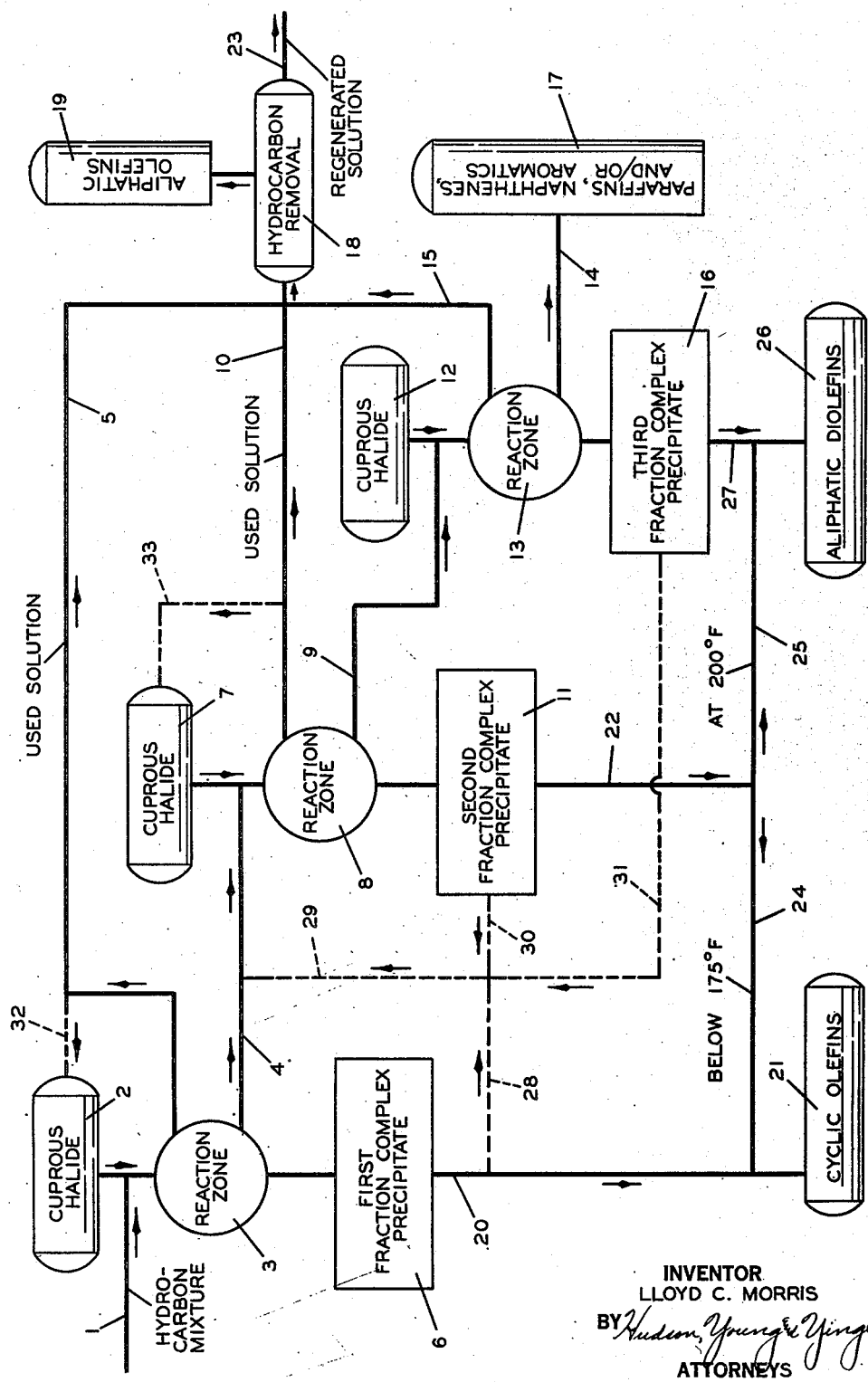
INVENTOR
LLOYD C. MORRIS
BY Hudson, Younger & Yinger
ATTORNEYS Patented Oct. 9, 1945

2,386,335

UNITED STATES PATENT OFFICE 2,386,335

PROCESS FOR THE SEPARATION OF HYDROCARBONS

Lloyd C. Morris, Bartlesville, Okla., assignor to Phillips Petroleum Company, a corporation of Delaware Application April 6, 1942, Serial No. 437,904

13 Claims. (Cl. 260—666)

This invention relates to a process for the separation of the components of hydrocarbon mixtures. More specifically, it concerns a chemical process for the above mentioned separation through formation of metal salt-hydrocarbon complexes.

Thermal cracking processes, such as the low pressure cracking of a mixture of the lower boiling paraffin hydrocarbons, may produce a cracking furnace effluent consisting of olefins, diolefins, aromatics, and naphthenes, together with varying amounts of unconverted paraffins. Catalytic conversion of the same type of charge stocks produces mixtures of the same classes of compounds, but in different proportions depending on the catalyst, the charge stock, and the conditions used.

The mixtures obtained from thermal and/or catalytic hydrocarbon conversion processes are customarily subjected to a preliminary fractionation wherein portions consisting essentially of hydrocarbons of the same number of carbon atoms per molecule are produced. These fractions are, in turn, complex mixtures, consisting of representatives of many different classes of hydrocarbons. For instance, a $C_5$ hydrocarbon mixture with a 20° F. boiling range segregated from the products of a low pressure cracking process contained appreciable proportions of aliphatic olefins, aliphatic diolefins, cyclic olefins, and cyclic diolefins.

Further fractionation of such mixtures may yield products with narrower boiling ranges, but such procedures are expensive, and in many cases formation of constant boiling mixtures makes separation and recovery of the pure components by conventional fractionation impossible. Such constant boiling mixtures are formed particularly between hydrocarbons of different types, such as cycloolefins with diolefins, naphthenes with paraffins, aromatics with various aliphatics, etc.

Azeotropic distillation with various substances added as entraining agents has been used for this type of separation but such methods have many inherent disadvantages among which are necessity for elaborate equipment, and losses of entraining liquids. In addition, removal of the last traces of entraining agent from the finished product is often difficult, and the presence of this impurity is frequently very undesirable in subsequent utilization of the product.

In the light of the above discussion, the utility of a selective chemical separation process for the treatment of hydrocarbon mixtures will be apparent. The effectiveness of such a process may be based on the separation and recovery of one or more compounds or classes of compounds in substantially pure form. Also, when used in conjunction with operations such as fractionation, chemical processes may result in a degree of separation impossible by purely physical means.

Various chemical separations of hydrocarbons have been previously proposed, but in general, these have been useful in only a single step to remove and/or recover a single type of hydrocarbon compound; for instance, the separation of olefins from paraffins, or the separation of diolefins from other hydrocarbons. Also, in many cases, as the use of maleic anhydride in the last mentioned separation, the chemical reaction is substantially irreversible and one or more of the classes of hydrocarbons cannot be recovered. The advantages of my process compared with those suggested earlier will become apparent from the following disclosure.

It is an object of this invention to provide a process for the separation of hydrocarbons of different types. Another object is to utilize the selective formation of cuprous halide-hydrocarbon complexes to accomplish such separations. A further object is to provide a chemical procedure for the separation of the components of hydrocarbon mixtures of such closely adjacent boiling points that practical concentration by fractional distillation of the mixtures is difficult or impossible. A further object is to provide a process for the resolution of complex hydrocarbon mixtures comprising saturated and unsaturated aliphatic and cyclic compounds into as many as four portions comprising essentially (1) paraffins, naphthenes, and/or aromatics, (2) aliphatic olefins, (3) cyclic olefins, and (4) aliphatic diolefins. A still further object is to provide for the concentration, or separation in substantially pure form if desired, of the various types of hydrocarbons referred to above. Another object is to provide a process for the manufacture of cyclic olefins suitable for use in synthetic chemistry, for the preparation of special motor fuel blends, etc. Yet another object is to provide for the manufacture of substantially pure diolefins for use in polymerization to useful products such as synthetic rubber and resins. Various other objects will be apparent from the more detailed disclosure which follows.

It is known that aliphatic olefins and diolefins undergo a thermally reversible reaction with various metal salts such as those of the heavy metals of groups I and II of the periodic system, and particularly with cuprous halides, to produce complex addition compounds. I have shown in my co-pending application, Serial No. 437,903, filed of even date herewith that cyclic olefins form insoluble reaction products with cuprous halides, and have further pointed out in other co-pending applications, Serial Nos. 437,901 and 437,902, also filed of even date herewith, that the cyclic olefin complex is both more readily precipitated from hydrocarbon mixtures, and is less stable thermally than the corresponding conjugated aliphatic diolefin complex. I now propose to describe an improved chemical procedure whereby hydrocarbon mixtures may be resolved into various classes with satisfactory recovery of any or all classes including the non-reactive hydrocarbons as a class.

In its basic aspects, my process for the segregation and recovery of the components of hydrocarbon mixtures of the type described comprises reacting the hydrocarbon mixture with aqueous cuprous halide reagents under conditions which cause formation of hydrocarbon-cuprous halide complex compounds. By this operation, any hydrocarbon mixture is resolved into three types of components, as follows: (1) components non-reactive with cuprous halides, (2) components forming complex compounds soluble in the aqueous reagent, and (3) components, including cyclic olefins, forming complex compounds insoluble in the reaction mixture. Thus a separation may be accomplished, with the compounds corresponding to the above-listed types comprising (1) paraffins, naphthenes and/or aromatics, (2) aliphatic olefins and (3) aliphatic diolefins and cyclic olefins. In addition, my process includes a method for the separation and recovery of cyclic olefins and aliphatic diolefins by a procedure combining fractional precipitation of the insoluble complex compounds and fractional decomposition of the precipitates at a series of selected temperature levels.

In order to point out more clearly the various steps in the operation of my process, the accompanying drawing is provided. This drawing represents a flow diagram, one of the many possible arrangements of equipment for detailed segregation of the components of a hydrocarbon mixture of the type described. In the drawing, the hydrocarbon mixture from line 1 is mixed with a predetermined amount of cuprous halide reagent from storage 2 in reaction zone 3. From zone 3 unreacted hydrocarbons are removed through line 4, used aqueous solution is taken through line 5, and the fraction of precipitated complex compounds is taken into unit 6.

This operation is repeated with the hydrocarbon passing through line 4 being mixed with an additional quantity of cuprous halide reagent from storage 7 in reaction zone 8. Again, the unreacted hydrocarbons are removed through line 9, while used solution is taken through line 10 and the second fraction of precipitated complex compounds is taken to unit 11.

The hydrocarbons passing through line 9 are given a third treatment with an excess of cuprous halide from storage 12 in reaction zone 13 which may be held at a relatively much higher pressure than zones 3 and 8. From zone 13, the unreacted hydrocarbons pass through line 14 to storage 17, the third fraction of precipitated complexes is taken to unit 16, while the used solution passes through line 15 to regenerating zone 18 into which may also come the used solutions from zones 3 and 8 through lines 5 and 10. By pressure reduction and/or heating in zone 18, the cuprous halide solution is substantially freed of dissolved hydrocarbon complex compounds and the hydrocarbons consisting essentially of aliphatic olefins are taken to storage 19. The regenerate solution in line 23 may be returned to reagent storage vessels, usually after adjustment of the cuprous halide concentration.

In some instances, the cuprous halide reagent in the first storage vessel may be different from the reagent used in subsequent reaction zones. This reagent solution may then be segregated by return to the storage vessel through line 32. Such a procedure may of course be extended to subsequent stages as is indicated for the second reaction zone by means of reagent recycle line 33.

The fractions of precipitated cuprous halide complex compounds in units 6, 11, and 16 are treated to release the hydrocarbons by heating for suitable periods at selected temperature levels between about 125 and 200° F. From unit 6, the hydrocarbons desorbed at temperatures up to about 175° F. comprise cyclic olefins and are taken through line 20 to storage 21. Any further hydrocarbons desorbed at temperatures above about 175° F. may also include aliphatic diolefins, and may be taken through lines 28 and 29 and added to the hydrocarbon stream in line 4.

The hydrocarbons desorbed in unit 11 at temperatures below about 175° F. are normally predominantly cyclic olefins and are taken through lines 22 and 24 to storage 21. At higher temperatures of about 175 to 185° F. a mixture of cyclic olefins and aliphatic diolefins may be produced, and this mixture may be taken through lines 30 and 29 for recycling through line 4. Higher temperatures up to about 200° F. may then produce high purity aliphatic diolefins which pass through lines 22 and 25 to storage 26.

The desorption in unit 16 may produce substantially only aliphatic diolefins which are taken through line 27 to storage 26. If mixtures are released at temperatures below about 185° F., these mixtures may be returned for treatment through lines 31 and 29 to the hydrocarbon stream in line 4.

The operations illustrated in the flow diagram are obviously capable of extensive modifications, depending on the composition of the hydrocarbon mixtures treated, the degree of separation desired, and the purity of the various types of hydrocarbons recovered. Some of the more apparent alternative operations will be described, although no attempt will be made to include all the modifications possible within the scope of the present disclosure.

The process is not limited to any particular number of reaction steps nor to the use of the same reagent in each reaction zone. Since the cyclic olefins react more readily than the aliphatic diolefins to form insoluble complex compounds, the cyclic olefin content of a mixture may be rather completely separated and recovered in very pure form by employing a larger number of treating steps each designed to precipitate a proportionately smaller fraction of the cyclic olefin and/or aliphatic diolefin content. When this is done, the co-precipitation of cyclic olefins and aliphatic diolefins may be substantially restricted and the fractional desorption procedure may be of less importance with recycling of smaller mixed hydrocarbon fractions.

Conversely, fewer treating steps may be used to react proportionately larger fractions of the cyclic olefin and/or aliphatic diolefin content. In this method, one or more relatively large mixed fractions may be obtained which are resolved by control of the desorption temperature, more complete separation being obtained by using a greater number of temperature levels. In either case, depending on the cyclic olefin-aliphatic diolefin concentration ratio, the choice of the number of treating steps and the control of desorption temperatures produce a very satisfactory separation and recovery of these classes of hydrocarbons.

The initial precipitation and recovery of high purity cyclic olefins may be made even more selective through the use of cuprous bromide reagents and/or of strongly acidic solutions of either cuprous bromide or chloride in the initial stage or stages of the fractional precipitation procedure. Both modifications increase the selectivity of reaction with cyclic olefins, perhaps by retarding aliphatic diolefin precipitation, and may be employed as dictated by the composition of the original hydrocarbon mixture to increase the efficiency of the separation in fewer steps.

The process permits reagent segregation, and a relatively neutral or basic cuprous halide reagent may be employed in the precipitation of aliphatic diolefins as well as in the separation of aliphatic olefins in later stages after acidic solutions have been used in the initial treating steps. In such cases, the used solutions from the reaction zones are returned to the proper supply vessels instead of being taken to a common regenerating zone. The cuprous halide content of the reagent solutions may be renewed either in the supply vessel or elsewhere as desired.

The amounts of cuprous halide supplied to each step of the fractional precipitation operation may be calculated on the basis of reaction with the total precipitatable material, or a fraction of either the cyclic olefin or the aliphatic diolefin content. The amount of reagent and the fraction reacted is usually chosen to produce at least one portion of cyclic olefins and one of aliphatic diolefins of high purity, while the fractions yielding mixtures are held to a minimum. When either class is present in relatively large excess, the fractions precipitated are ordinarily based on the predominant compound. For example, in treating a hydrocarbon mixture containing an excess of cyclic olefins compared to aliphatic diolefins, the quantity of reagent for each treating step may be based on the cyclic olefin content, with one or more fractions of substantially pure cyclic olefin complex being obtained. Then, when sufficient cuprous halide has been furnished in several stages to react with say 100 to 110 per cent of the original cyclic olefin content, the unreacted aliphatic diolefins may ordinarily be precipitated substantially free of cyclic olefins. This last named operation may be made in a series of steps or preferably in a single step with excess cuprous halide.

Since the fractional precipitation procedure usually requires in most stages the use of insufficient cuprous halide, the used solutions from the first reaction zones will be substantially spent. The amount of dissolved aliphatic olefin complex in these spent solutions may, therefore, be very small, and the solutions may be returned to the supply vessel without treatment for aliphatic olefin recovery. Thus, the aliphatic olefin recovery is somewhat limited to those reaction zones supplied with an excess of cuprous halide although it may be expedient for other reasons to recombine the various portions of used solution of similar nature prior to regeneration and/or return to the various supply vessels.

The fractional precipitation may be accomplished by limiting the contact times, either instead of or in conjunction with the use of insufficient cuprous halide for complete precipitation, so that the quantity of insoluble complexes precipitated is only a fraction of the total insoluble complexes obtainable from the hydrocarbon mixture.

When aliphatic diolefins are absent from a hydrocarbon mixture to be treated by the present process, the procedure is greatly simplified. One or more treating steps may be employed and after contacting the hydrocarbons with excess cuprous halide reagent, the separation of soluble aliphatic olefin and insoluble cyclic olefin cuprous halide complexes from non-reactive hydrocarbons may be readily effected.

The cuprous halide reagents employed in my process may be aqueous solutions and/or suspensions of cuprous chloride or bromide, or even in some specific cases solid reagents which feature the halide distributed on the surface of a suitable carrier material. As indicated above, the nature and composition of the reagent may be different in the various reaction zones of the process. Thus, clear aqueous solutions are often preferred in the fractional precipitation and separation of cyclic olefin and/or aliphatic diolefins. Solutions containing solid cuprous halide in suspension may be suitable for other stages of the process wherein an excess of cuprous halide is permissible or a relatively complete separation of the solid material from the solution is not required.

The cuprous halide solutions may be prepared through the agency of solutizers such as the water-soluble halides of the alkali and alkaline earth metals. For example, cuprous chloride solutions in water saturated with sodium or ammonium chlorides are often employed. These solutions have a pH on the acid side due to the buffering action of the dissolved salts, although the pH is not ordinarily below about 3. The reagents described herein as acidic ordinarily contain added non-oxidizing strong mineral acid in concentrations ranging from about 0.1 to 10 normal or preferably from about 2 to about 8 normal. Such acidic solutions may be prepared by dissolving cuprous halide in a solution of the corresponding hydrogen halide, or by adding sufficient diluted non-oxidizing mineral acid such as sulfuric or phosphoric acid to a water solution of cuprous halide and an alkali metal or ammonium halide. The various reagent solutions may also contain a minor proportion of a suitable organic or inorganic reducing agent such as sodium bisulfite or hydroxylamine hydrochloride to minimize oxidation of the cuprous ion.

The reagent solutions and the cuprous halide residue which is left following the decomposition of the precipitated complex compounds may be recombined and re-used in the process. In this manner, with suitable means for recycling liquid and/or solid ingredients, the process may be made continuous to the point that only minor amounts of make-up cuprous halide reagents are required.

The temperatures maintained in the reaction zones wherein the cuprous halide complex compounds are formed are usually atmospheric or subatmospheric temperatures below about 80° F.

Temperatures of about 35 to about 50° F. are preferred for many of the reaction stages in the precipitation of insoluble complexes, while the formation of soluble complex compounds may be favored by these or somewhat lower temperatures. Thus, the temperature may be the same in all reaction zones or there may be a slight downward gradation with the lowest value in the final stage.

Hydrocarbon mixtures may be used in either liquid or vapor phase, depending on the particular hydrocarbons being treated and upon desired reaction conditions. Pressures in the reaction zones are ordinarily low superatmospheric pressures between 15 and 500 pounds per square inch gage. When treating hydrocarbon mixtures in liquid phase sufficient pressure is supplied in the initial process stages to prevent vaporization and to maintain suitable flow rates through process equipment, including mixing devices, filters, and the like. Substantially higher pressures are often employed in the reaction zone wherein the aliphatic olefin complex is formed since this reaction is favored by higher pressures in excess of those necessary to maintain the hydrocarbon in the liquid state. Thus, in order to promote the formation of aliphatic olefin complex compounds in the cuprous halide solution, pressures of 100 to 500 pounds per square inch gage have been employed.

Intimate contact between hydrocarbon liquids and the aqueous reagents is obtained through the use of suitable mixing devices such as centrifugal contactors, jet mixers and/or mechanical stirring devices of various types. The contact is maintained in each zone for a time sufficient for the amount of reaction assigned to the particular zone. The contact time required will vary somewhat with the efficiency of mixing, and while the reaction involved is substantially instantaneous, the actual time allowed in large-scale operations may range from about one minute to about one hour.

Separation of the two liquid and one solid phases which may exist in the effluent from the reaction zones is accomplished by conventional means. The hydrocarbon phase is ordinarily settled free of aqueous and solid material and the solid precipitate may be separated from one or both of the liquid phases by means of decantation, centrifugation, pressure filtration, or the like. The hydrocarbon liquid and clear aqueous solution are then taken to subsequent process equipment while the solid material comprising cuprous halide complex compounds is treated for hydrocarbon recovery.

The decomposition of the solid complex compounds is accomplished by heating to moderate superatmospheric temperatures in the range of about 125 to 200° F. or higher. The thermal stability of the different classes of complex compounds is quite different, and the fractional desorption operation employed with mixed precipitates is adjusted to this variation in decomposition rates at temperature levels within this range.

The cyclic olefin-cuprous halide complex is decomposed at satisfactory rates when heated to 125 to 175° F. at atmospheric pressure, while the decomposition rate of the aliphatic diolefin complex is at a comparable level only at temperatures of 175° F. or higher, also at atmospheric pressure. Thus, in decomposing the precipitated complexes from the various reaction zones, cyclic olefin recovery may be accomplished at temperatures below 175° if other complexes are present, or at still higher temperatures from substantially pure cyclic olefin complexes. Similarly, aliphatic diolefin complexes may be freed of contaminants at temperatures below about 150 to 175° F., and the diolefin recovered at temperatures of about 200° F. The rate of heating and the time provided at each temperature level will thus be determined by the composition of the precipitated solid material and/or the reaction zone from which it was obtained.

All the above named temperatures may be raised or lowered by corresponding changes in the pressure on the desorption vessel. Thus, it may be desirable in some cases to use reduced pressures to enable the use of lower temperatures, although the comparative rate of decomposition of the different complex compounds is not greatly affected.

In the preparation of cyclic olefin and/or aliphatic diolefin concentrates of high purity it is often desirable to wash the separated solids from a reaction zone to remove adsorbed but uncombined hydrocarbons. This is accomplished, according to one method, by washing the precipitate with a low-boiling paraffinic hydrocarbon liquid such as butane at temperatures below those causing decomposition of the complex compounds. Any butane remaining in the solid material may then be removed by conventional means.

The recovery of aliphatic olefins from aqueous cuprous halide reagents is accomplished by raising the temperature of the reagent to evolve the hydrocarbons. This action is promoted by reduction of the pressure on the reagent, and either or both means may be employed to rapidly remove aliphatic olefins from reagent solutions or slurries. Temperatures favoring rapid decomposition of the aliphatic olefin-cuprous halide complex vary with the olefin, and may range from about 50 to about 200° F. or higher. It is often desirable to reduce the pressure on a cuprous halide solution containing aliphatic olefin complexes prior to raising the temperature to evolve the hydrocarbons. This sequence of operations aids in the removal of some dissolved but unreacted hydrocarbons and increases the purity of the aliphatic olefins subsequently recovered.

While my process may be used to treat petroleum or other hydrocarbon fractions of wide boiling range, it is frequently advantageous to precede treatment according to the present invention with fractionation to produce mixtures of relatively narrow boiling range. In many instances, preliminary fractionation may produce portions consisting of $C_3$ and lighter, $C_4$, $C_5$, and $C_6$ and heavier hydrocarbons, and my process may be applied to the last three portions or to the products of further fractionation of the original portions. For example, a $C_5$ hydrocarbon mixture may be separated into a lower-boiling fraction and a higher-boiling fraction, with the latter containing substantially all of the cyclo-olefinic hydrocarbons.

The wider boiling range mixtures are treated with the recovery of several members of each class of compounds, the recovered concentrates produced by the process may be fractionated to segregate each member of the class in substantial purity. Thus, when a mixture of cyclopentene and cyclohexene is obtained, the mixture may be fractionated to segregate each of the cyclic olefins. Further, when a mixture of aromatic, paraffin and/or naphthene hydrocarbons is obtained after removal of other compounds with cuprous halide reagents, fractionation, azeotropic distillation, solvent extraction, or the like may be employed to separate the classes of hydrocarbons in such a mixture.

Generally, acetylenic hydrocarbons are present in small percentages, if at all, in the type of hydrocarbon mixtures usually encountered. The lower-boiling acetylenes are readily removed by fractionation while others are preferably removed by selective chemical action or the like prior to treatment of the mixture by my process, in order to avoid unnecessary expenditure of reagents. Cyclopentadiene and similar hydrocarbons are frequently present in appreciable quantities, and may go through the process substantially unchanged. They are readily removed by auto- or induced-dimerization followed by fractionation, either before or after treatment of the hydrocarbon mixture by my process, although preferably before.

The principles involved in this disclosure are exemplified by the following typical case, which is presented as one of many possible modifications and is not to be construed as limiting the invention in any way.

*Example*

A mixture of $C_5$ hydrocarbons, free of acetylenes and cyclic diolefins, was obtained by fractionation of the effluent from a thermal cracking unit which was operating on a charge of mixed ethane-propane. Analysis indicated that this mixture consisted principally of trimethylethylene, piperylene, cyclopentene, and cyclopentane. This hydrocarbon mixture was intimately contacted in three successive stages of 45° F. and 25 pounds gage pressure with three portions of clear, saturated aqueous solution of cuprous chloride and ammonium chloride, containing in addition one per cent sodium bisulfite. Each portion of the reagent contained sufficient cuprous chloride to react with only 50 per cent of the cyclopentene in the mixture. Time of contact in each stage was limited so that most, although not all of the cuprous chloride in each portion of reagent was used up to form complexes. The precipitates formed by each portion of reagent were segregated. The first was decomposed by heating to 175° F. and the hydrocarbon recovered was 98 per cent cyclopentene. The second portion of precipitate was heated at 175° F., until decomposition had ceased. The major portion of complex was decomposed and the hydrocarbon obtained was 98 per cent cyclopentene. The remainder of the precipitated complex was then heated for one hour at 200° F. The hydrocarbon recovered was 90 per cent cyclopentene and 10 per cent piperylene; this mixture was recycled to the raw feed stream. The third portion of precipitated complex was decomposed in the same manner as the second. The hydrocarbon recovered at 175° F. was 96 per cent cyclopentene. The minor proportion evolved at 200° F. was 80 per cent cyclopentene and was recycled for further treatment.

The remaining unreacted hydrocarbon was intimately contacted at about 40° F. and 250 pounds gage pressure with a thin slurry of cuprous chloride in a saturated solution of ammonium chloride and containing in addition one per cent sodium bisulfite. After sufficient contacting to produce complete reaction, the unreacted hydrocarbon was separated from the mixture. The unreacted hydrocarbon proved to be 95 per cent cyclopentane. The aqueous solution and precipitate were separated by filtration and the solution was combined with that obtained in the three earlier precipitations. This combined solution was heated to 200° F. and the liberated hydrocarbon recovered. This hydrocarbon was 95 per cent trimethylethylene.

The precipitated complex from the last stage was washed with butane at 40° F. and 50 pounds gage. The butane was flashed off the solid and the precipitate was heated for two hours at each of the following temperatures; 140° F., 175° F., and 200° F. The small amount of hydrocarbon evolved at 140° F. was 62 per cent piperylene, and a portion evolved at 175° F. was 80 per cent piperylene; these mixtures were recycled to the process. The remainder of the precipitate was then decomposed at 200° F. to give 98 per cent piperylene. The last-named portion amounted to about 90 per cent of the total hydrocarbons recovered in this step.

I claim:

1. A process for the separation of (1) cyclic olefins, (2) aliphatic diolefins, (3) aliphatic olefins, and (4) paraffins, naphthenes, or aromatics, which comprises contacting a mixtures containing the same with at least two portions of cuprous halide reagent, at least one of said portions comprising an aqueous cuprous halide reagent, to precipitate portions of insoluble cuprous halide-hydrocarbon complexes, whereby predominately cyclic olefins are separated by the first portion and predominately aliphatic diolefins are separated by the last portion, separating aliphatic olefins by solution of their complexes in said aqueous reagent, and separating unreacted paraffins, naphthenes, or aromatics.

2. A process as in claim 1 wherein at least the first portion of cuprous halide reagent comprises cuprous bromide.

3. A process for the separation of (1) cyclic olefins, (2) aliphatic diolefins, (3) aliphatic olefins, and (4) paraffins, naphthenes, or aromatics, which comprises contacting a mixture containing the same with at least two portions of cuprous halide reagent, at least one of said portions comprising an aqueous cuprous halide reagent, to precipitate portions of insoluble cuprous halide-hydrocarbon complexes and to dissolve soluble cuprous halide-hydrocarbon complexes, whereby said paraffins, naphthenes, or aromatics are recovered substantially unreacted, and decomposing said complexes to recover predominantly cyclic olefins from at least the first portion of said insoluble complexes, predominantly aliphatic diolefins from at least the last portion of said insoluble complexes, and predominantly aliphatic olefins from said soluble complexes.

4. A process as in claim 3 wherein at least the first portion of cuprous halide reagent comprises an aqueous solution containing a non-oxidizing strong mineral acid.

5. A process for the recovery of (1) cyclic olefins, (2) aliphatic diolefins, (3) aliphatic olefins, and (4) paraffins, naphthenes, or aromatics, from a mixture containing the same, which comprises contacting said mixture with an aqueous cuprous halide reagent to precipitate insoluble cuprous halide-hydrocarbon complexes and to dissolve soluble cuprous halide-hydrocarbon complexes, thus recovering said paraffins, naphthenes, or aromatics substantially free from the other above-named types of hydrocarbons, recovering said aliphatic olefins by decomposition of said soluble complexes, and heating said insoluble complexes at a series of increasing temperatures to decompose the same and to recover predominately cyclic olefins at the lower temperatures and predominately aliphatic diolefins at the higher temperatures.

6. A process as in claim 5 wherein said aqueous cuprous halide reagent comprises cuprous chloride.

7. A process for the separation and recovery of (1) cyclic olefins (2) aliphatic olefins and (3) paraffin, naphthene, and aromatic hydrocarbons from mixtures containing the same which comprises contacting said mixtures in a reaction zone with an excess of aqueous cuprous halide reagent and thereby effecting the precipitation of cyclic olefins as an insoluble complex compound, the solution of aliphatic olefins in the reagent solution as a soluble complex compound, and the rejection of paraffin, naphthene, and aromatic hydrocarbons as substantially non-reactive, removing from the reaction zone and separating unreacted hydrocarbons, aqueous solution and precipitated solids, subjecting said aqueous solution to elevated temperature and a pressure substantially lower than that maintained in the reaction zone whereby predominantly aliphatic olefin hydrocarbons are evolved, subjecting the precipitated solid material to elevated temperature to decompose the complex compound whereby predominantly cyclic olefins are evolved, and recovering thereby (1) cyclic olefins, (2) aliphatic olefins, and (3) paraffin, naphthene and aromatic hydrocarbons in separate portions of greatly increased concentration.

8. A process for the separation and recovery of (1) cyclic olefins, (2) aliphatic diolefins, (3) aliphatic olefins and (4) at least one of the group of paraffin, naphthene, and aromatic hydrocarbons, from a hydrocarbon mixture containing the same, which comprises the following steps: contacting said mixture in a series of successive reaction zones with successive portions of cuprous halide reagent each containing sufficient cuprous halide to precipitate a predetermined fraction of the hydrocarbons forming insoluble complex compounds, the cuprous halide reagent in at least the last reaction zone being an aqueous reagent, continuing said fractional precipitation to the extent that a substantial excess of cuprous halide is present in the final zone of said series after substantially complete precipitation of the insoluble complexes, removing from each of said reaction zones the unreacted hydrocarbons and solid cuprous halide complex compounds, the last-named comprising essentially cyclic olefin complex from at least the first of said zones and aliphatic diolefin complex from at least the last of said zones, passing the unreacted hydrocarbons in turn to each zone in said series and obtaining from the final zone a hydrocarbon concentrate of at least one of the group of paraffin, naphthene, and aromatic compounds, treating the aqueous reagent from at least the final reaction zone at elevated temperature and at a pressure substantially below that maintained in said final reaction zone to decompose aliphatic olefin complex compounds dissolved therein and recover therefrom predominantly aliphatic olefin hydrocarbons, heating the insoluble complexes from each of said zones to decompose same and recover the hydrocarbon content thereof, including heating the precipitated solid material from at least some of said reaction zones at a series of increasingly higher temperature levels between a minimum temperature producing decomposition of the cyclic olefin complex of lesser thermal stability and a maximum temperature producing decomposition of the aliphatic diolefin complex of greater thermal stability whereby substantial separation of cyclic olefins and aliphatic diolefins evolved from co-precipitated complex compounds from intermediate reaction zones is effected, and combining and recovering the cyclic olefins and the aliphatic diolefins recovered from all of said zones.

9. A process as in claim 8 wherein the reaction zones are maintained at temperatures below about 80° F., and at pressures between about atmospheric and 500 pounds gage, the final zone being at substantially higher pressure than the preceding zones.

10. A process as in claim 8 wherein a cuprous bromide reagent is employed in the initial reaction zone whereby substantially pure cyclic olefin complex compounds are precipitated.

11. A process as in claim 8 wherein a cuprous halide solution in dilute non-oxidizing strong mineral acid of about 2 to about 8 normality is employed in the initial reaction zone whereby substantially pure cyclic olefin complex compounds are precipitated.

12. A process as in claim 8 wherein the fractional precipitation and fractional decomposition operations produce substantially pure cyclic olefins from at least the initial reaction zone, substantially pure aliphatic diolefins from at least the final reaction zone, and mixtures of unsatisfactory purity produced by any of the intermediate reaction zones are recycled to the hydrocarbon stream undergoing treatment at a point of suitably corresponding composition.

13. A process for the segregation and recovery in concentrated form of (1) paraffins, naphthenes or aromatics, (2) aliphatic olefins, and (3) aliphatic diolefins and cyclic olefins from a hydrocarbon mixture containing the same which comprises reacting said hydrocarbon mixture with an aqueous cuprous halide reagent and thereby effecting precipitation of the aliphatic diolefin and cyclic olefin in the form of a complex with the cuprous halide, and solution of the aliphatic olefin in the reagent in the form of a soluble complex with the cuprous halide while leaving unreacted the paraffins, naphthenes or aromatics contained in said mixture, separating said precipitated complex, said unreacted hydrocarbons and the resulting reagent from one another, recovering in concentrated form the aliphatic diolefin and cyclic olefin content of the precipitated complex by heating the same, and recovering in concentrated form the aliphatic olefin from said resulting reagent by heating the same.

LLOYD C. MORRIS.